US007224403B2

(12) United States Patent
Bowden

(10) Patent No.: US 7,224,403 B2
(45) Date of Patent: May 29, 2007

(54) TELEVISED SCOREBOARD OR STATISTICS PRESENTATION WITH COLORS CORRESPONDING TO PLAYERS' UNIFORMS

(76) Inventor: Raymond E. Bowden, 1940 W. Idaho Blvd., Emmett, ID (US) 83617

( * ) Notice: Subject to any disclaimer, the term of this patent is extended or adjusted under 35 U.S.C. 154(b) by 15 days.

(21) Appl. No.: 10/921,559

(22) Filed: Aug. 19, 2004

(65) Prior Publication Data
US 2005/0018085 A1    Jan. 27, 2005

Related U.S. Application Data

(63) Continuation-in-part of application No. 09/835,968, filed on Apr. 17, 2001, now abandoned.

(51) Int. Cl.
*H04N 9/64* (2006.01)
*H04N 11/00* (2006.01)
(52) U.S. Cl. .................. 348/569; 348/563; 348/564; 348/566; 348/560; 348/157
(58) Field of Classification Search ........... 348/569, 348/560, 563, 564, 565, 566, 584, 586, 722, 348/589, 578, 588, 157, 599, 577; 345/632, 345/719, 723, 764, 765; 725/47, 43, 45, 725/46; 273/244, 247, DIG. 26; 473/468; 715/716, 723
See application file for complete search history.

(56) References Cited

U.S. PATENT DOCUMENTS 4,155,095 A * 5/1979 Kirschner .................. 348/701
4,186,928 A * 2/1980 Hunt, Jr. .................... 273/244
4,645,206 A * 2/1987 Todd ......................... 473/468
5,027,102 A * 6/1991 Sweeny ................. 340/323 R
5,090,735 A * 2/1992 Meaney et al. .............. 283/67
5,264,933 A * 11/1993 Rosser et al. .............. 348/578
5,400,081 A    3/1995 Chaplin ..................... 348/587
5,491,517 A    2/1996 Kreitman et al. ........... 348/581
5,612,711 A * 3/1997 Rose .......................... 345/59
5,695,401 A * 12/1997 Lowe et al. .................. 463/4
5,808,695 A    9/1998 Rosser et al. .............. 348/584
5,953,076 A    9/1999 Astle et al. ................ 348/584
6,049,333 A * 4/2000 LaJoie et al. .............. 715/718
6,144,375 A * 11/2000 Jain et al. ................ 715/500.1
6,193,610 B1 * 2/2001 Junkin ....................... 463/40
6,271,890 B1 * 8/2001 Tamir et al. ............... 348/587
6,384,871 B1    5/2002 Wilf et al. ................. 348/578
6,481,011 B1    11/2002 Lemmons ................... 725/47
6,545,689 B1 * 4/2003 Tunli ........................ 715/719
6,606,104 B1    8/2003 Kondo et al. .............. 345/764
6,750,919 B1 * 6/2004 Rosser ....................... 348/584

OTHER PUBLICATIONS

Statement Concerning Wrestling in 1990, by Shane Kennedy.

* cited by examiner

*Primary Examiner*—David Ometz
*Assistant Examiner*—Jean W. Désir
(74) *Attorney, Agent, or Firm*—Kennedy Law Office; Shane A. Kennedy

(57) ABSTRACT

A method and apparatus for allowing a television viewer to quickly and easily relate the teams' names and scores to the players are disclosed. The teams' names and scores are presented on a small scoreboard or banner on the television screen, and either the backgrounds of the names and scores or the names and scores themselves are colored the same color as the selected uniform portions of the respective teams. This can also be applied to presentations of statistics.

9 Claims, 4 Drawing Sheets

TELEVISED SCOREBOARD OR STATISTICS PRESENTATION WITH COLORS CORRESPONDING TO PLAYERS' UNIFORMS

This application is a continuation-in-part application, and claims priority from, U.S. patent application Ser. No. 09/835,968, filed on Apr. 17, 2001 now abandoned, entitled "Scoreboard Tied to Players," the disclosure of which is incorporated herein by this reference.

BACKGROUND OF THE INVENTION

1. Field of the Invention

This invention relates to televised sporting events.

2. Related Art

Televised sporting events usually have a small scoreboard displayed on the television screen showing the name of each team or an abbreviation thereof, the score of each team, the quarter, period, or inning of the game, and the time left in the quarter or period, if applicable. In these scoreboards, each team's name and score, and the backgrounds for the names and scores, are the same color. The technology currently exists to choose the color for the display of the teams' names and scores, or background colors of the names and scores. However, in the prior art there is no relationship between the color of the teams' names and scores, or the background colors, and the teams' colors. Further, in the prior art, the same color is used for both teams' name and score, and the background for both is the same color.

It can be difficult for a viewer to relate the name and score of a team to the players on the field. This is due in part to the fact that many fans do not know each team's colors. The large number of teams in play makes it difficult to identify a team until a close-up camera displays a team name or logo.

Similarly, televised sporting events sometimes have a banner across the top or bottom of the television screen displaying the name and score of each team. Again, it can be difficult for a viewer to determine which players belong to which team, and hence, which team on the field is currently winning the game.

Televised sporting events also show statistics for each team, or for players from each team playing corresponding positions, or for other comparative purposes. Again, it can be difficult for a viewer to determine which team players belong to, making it difficult to determine which team has achieved the statistics shown.

SUMMARY OF THE INVENTION

The present invention solves the problem of relating the name and score, or statistics, of a team or player, to the players on the field, by utilizing different colors for either the background of the fonts or for the fonts themselves which display each team's name, score, or statistics. The colors will correspond to the colors of the players' jerseys or other portions of the uniforms.

BRIEF DESCRIPTION OF THE DRAWINGS

The accompanying drawings illustrate several aspects of embodiments of the present invention. The drawings are for the purpose only of illustrating preferred modes of the invention, and are not to be construed as limiting the invention.

DESCRIPTION OF THE PREFERRED EMBODIMENTS

The state of the art for color presentations on television screens is such that, as it relates to scoreboards and split (or mini) screens, each section of a mini-screen scoreboard can be presented in a large variety of colors, and the print and figures on those scoreboards can readily be presented in a large variety of colors. This capability is readily available on home personal computers, for example, with regular Microsoft Software.

Figure 1:
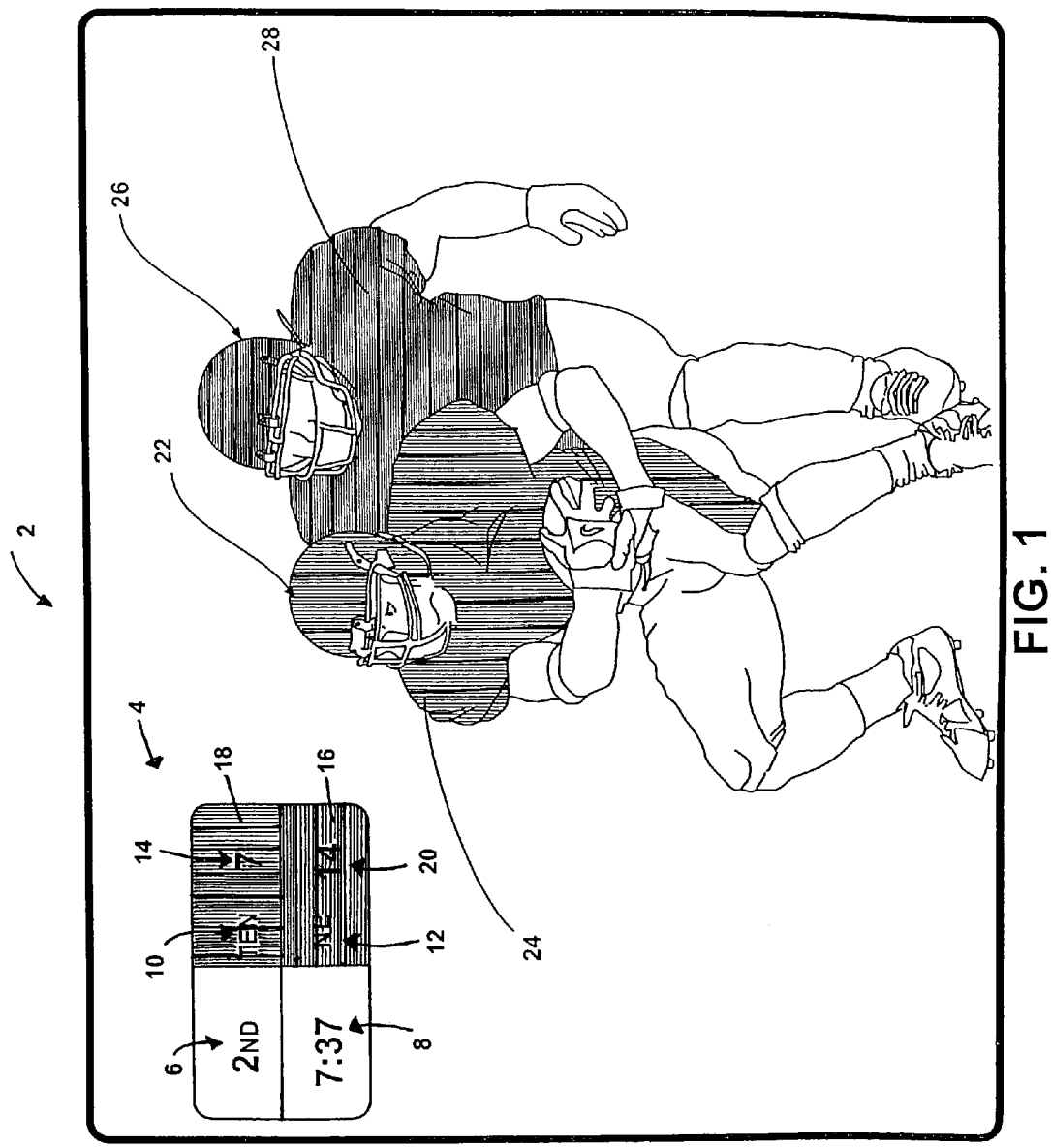
FIG. 1 represents an embodiment of the invention televising a football game with the scoreboard displaying each team's name, the score, the quarter, and how much time is left in the quarter.

According to the preferred embodiment of this invention, a color presentation system is utilized during the televised showing of a sports game, as shown in FIG. 1. Thus, a sports game is displayed on a television 2. A small scoreboard 4 is displayed in the upper-left hand corner of the television 2. The scoreboard 4 displays the quarter 6, the time 8 left in the quarter 6, an abbreviated first team name 10 and a first team score 14, an abbreviated second team name 12 and a second team score 16.

The television also displays players 22, 26, from opposing teams. The colors of the jerseys 24, 28, worn by the players, will have been chosen before the event is televised. The jerseys 24, 28, are of contrasting colors so that the players, 22, 26, spectators, and officials will be able to distinguish between different teams. According to the preferred embodiment, the first background 18 of the first team name 10 and first team score 14 is shaded the same color as the first team's jersey 22. Similarly, the second background 20 of the second team name 12 and second team score 16 is shaded the same color as the second team's jersey 28. A viewer is easily able to determine which team is winning the game by comparing the background colors 18, 20, to the colors of the jerseys 24, 28.

Figure 2:
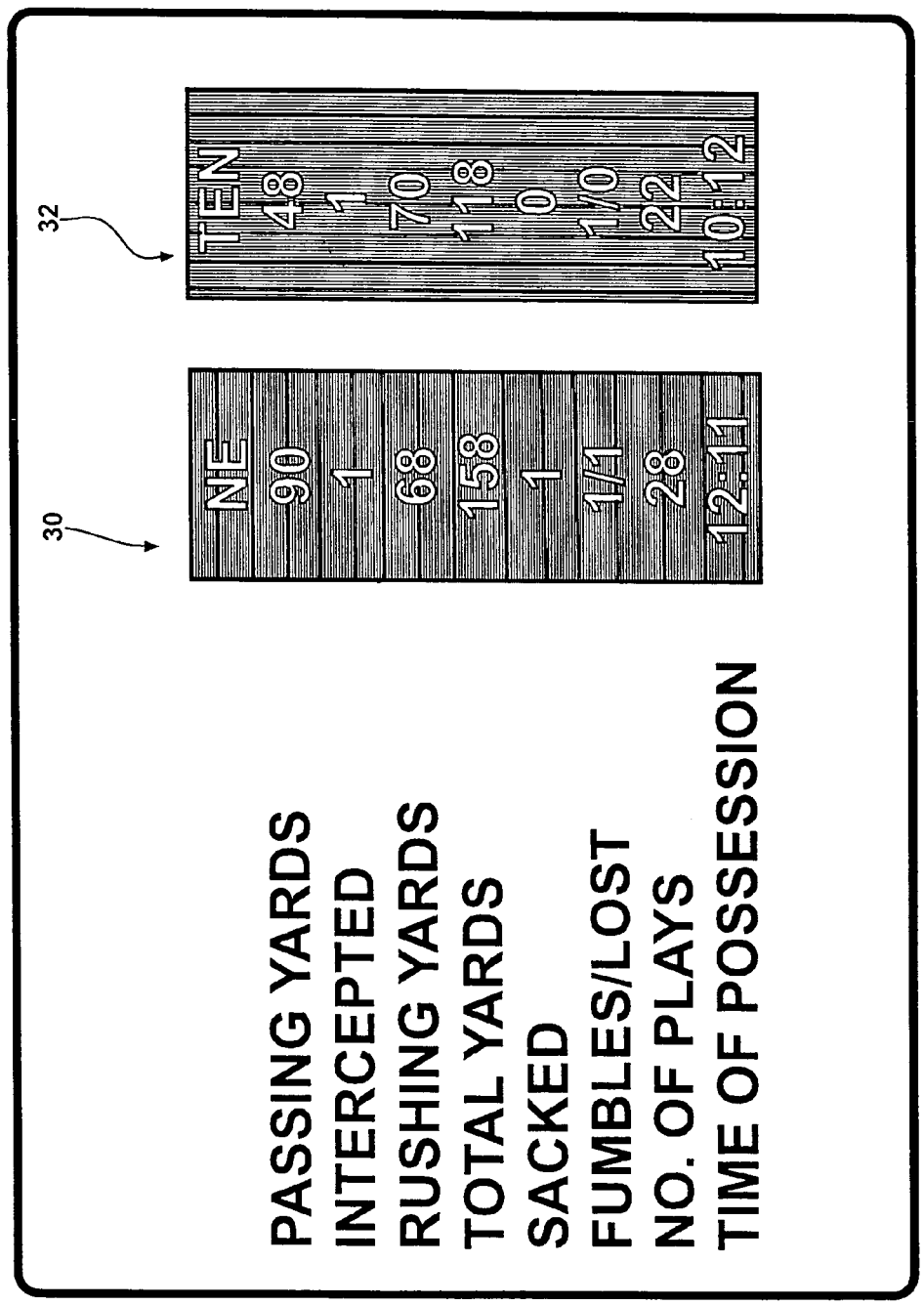
FIG. 2 represents an embodiment of the invention showing team statistics.
Figure 3:
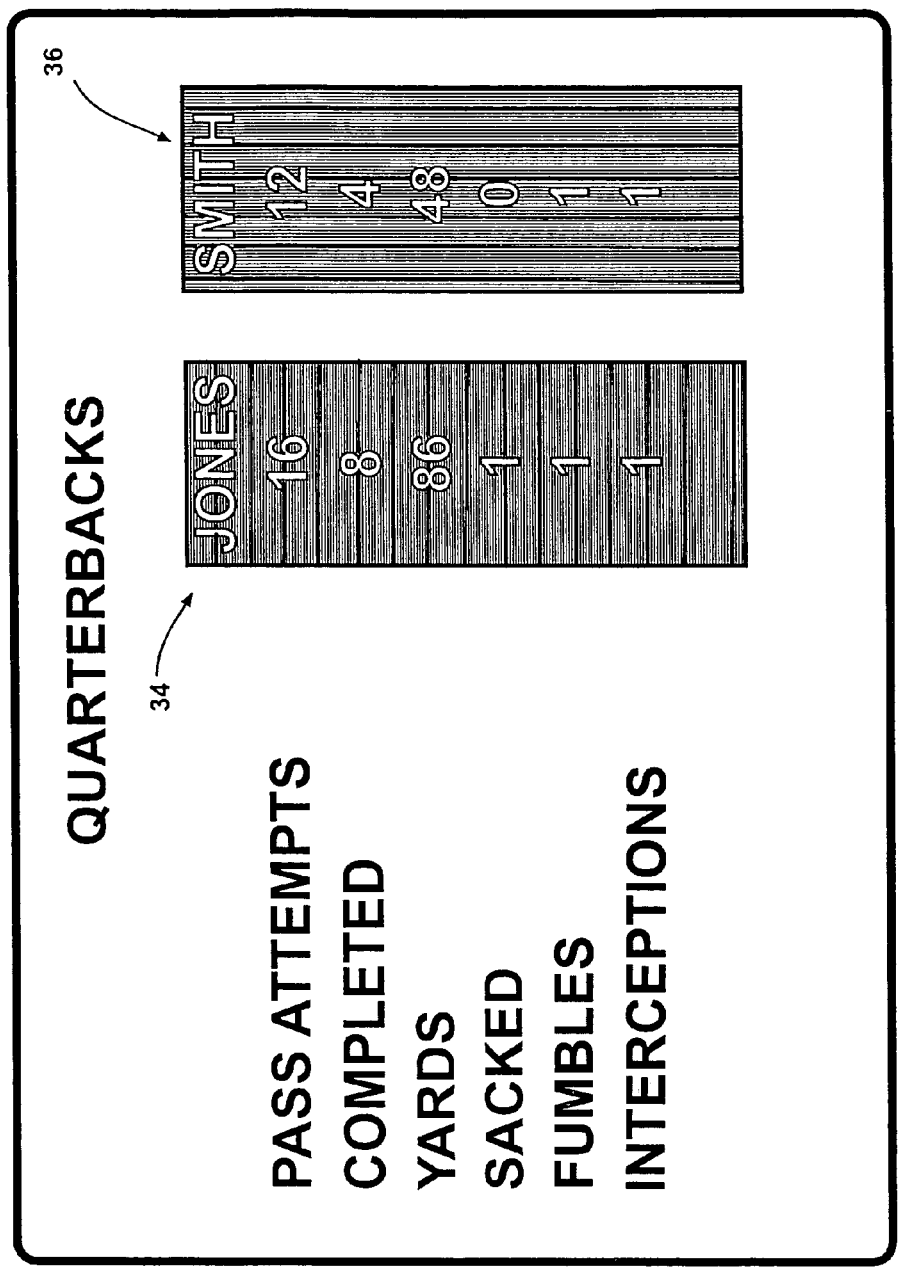
FIG. 3 represents an embodiment of the invention showing the statistics of each team's quarterback.

The invention can also be applied to displays of written information other than the teams' names 10, 12, and scores 14, 16, such as statistics, as shown in FIG. 2. Often, statistics will be displayed during a break in a game. In order to allow television viewers to easily determine which team has achieved which statistics, the background colors 30, 32, can be shaded colors corresponding to the jerseys 24, 28. This could also be applied to individual statistics for players playing certain positions, such as quarterback, by shading the background colors 34, 36, the same colors as the jerseys 24, 28, as shown in FIG. 3. The teams' names 10, 12, the teams' scores 14, 16, and team and individual statistics shall collectively be referred to as "written information."

Rather than shading the backgrounds 18, 20, 30, 32, 34, 36, the present invention could also be applied by coloring the letters and numbers themselves. Thus, the team names 10, 12, and scores 14, 16, would be shaded the same colors as the jerseys 24, 28. The backgrounds 18, 20, 30, 32, 34, 36, would then need to be in contrasting colors from the colors of the team names 10, 12, and scores 14, 16.

Figure 4:
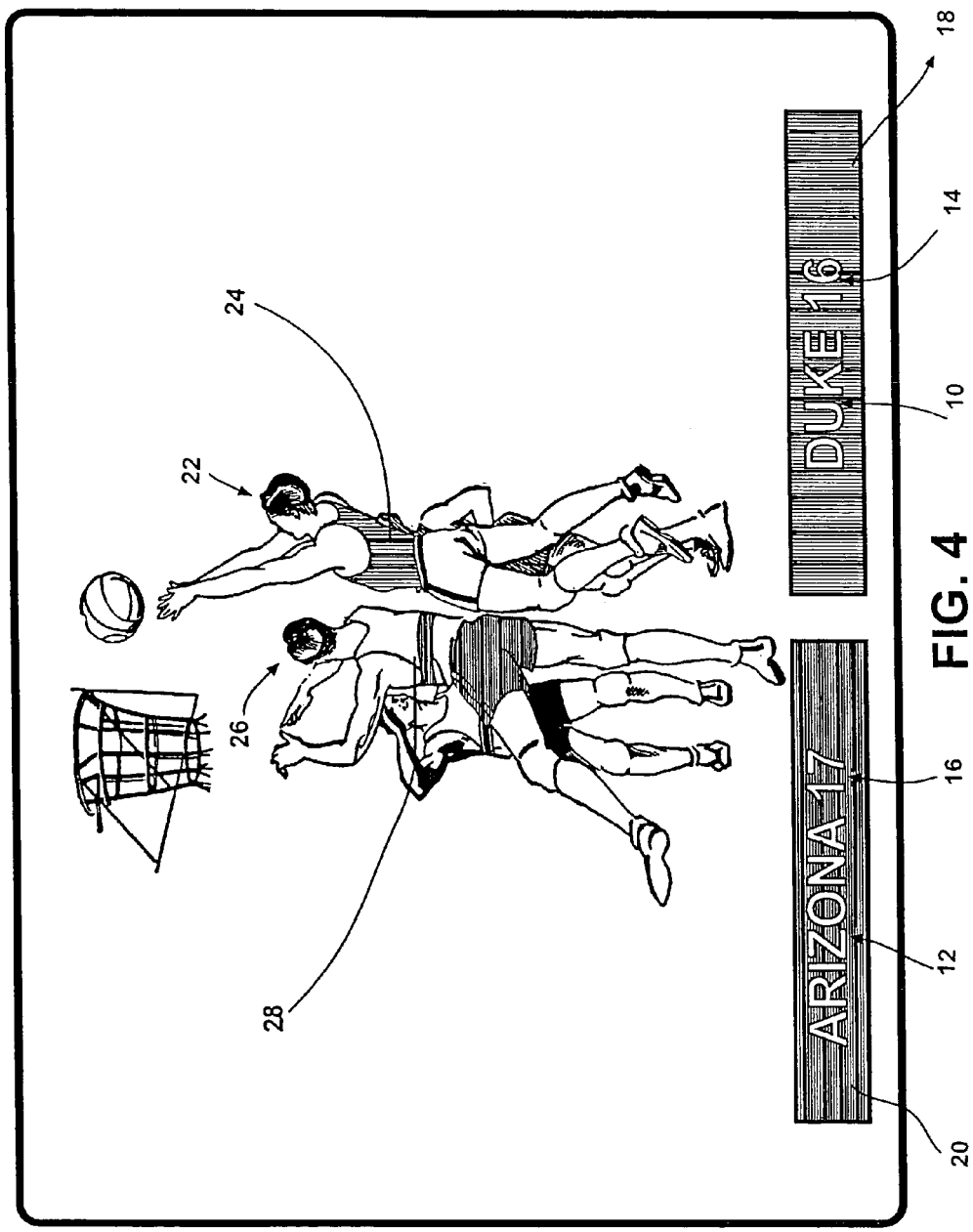
FIG. 4 represents an embodiment of the invention televising a basketball game with a banner across the bottom of the television screen displaying each team's name and score.

It is envisioned that the invention could also be applied to a banner at the top or bottom of the television 2 displaying the team names 10, 12, and scores 14, 16, as shown in FIG. 4.

It is also envisioned that the colors utilized for the backgrounds 18, 20, 30, 32, 34, 36, or teams names 10, 12, and scores 14, 16, could also correspond to portions of the uniforms other than the jerseys 24, 28, such as helmets, caps, shorts, pants, socks, shoes, or armbands. The portion of the first team's uniform to which the color of the first team name 10 and first team score 14, or first background 18, 30, 34, corresponds, could be different than the portion of the second team's uniform to which the color of the second team name 12 and second team score 16, or second background 20, 32, 36, corresponds. The color selected for each team will typically be the most distinctive color being worn by the team or the color least like the opposing team's color.

This invention has the advantage of allowing a television viewer to quickly and easily relate the team name 10, 12, and score 14, 16, to the players 22, 26, by comparing the background colors 18, 20, or font colors, to the colors of the jerseys 24, 28, or other portions of the uniforms. Thus, channel surfers who tune in to a game can quickly identify the team and players who are winning. Major television networks and cable television broadcasters often run short clips of previously televised games during daily news reports and in sports shows. Also, persons viewing short clips of previously televised games could easily tell which team had which score 14, 16, at the time events showed in the clip occurred.

Besides the sports football and basketball shown in the drawings, it is envisioned that the present invention could also be applied to other team sports, such as baseball, hockey, or soccer. It is also envisioned that this invention could be applied to individual sports.

Although this invention has been described above with reference to particular means, materials and embodiments, it is to be understood that the invention is not limited to these disclosed particulars, but extends instead to all equivalents within the scope of the following claims.

I claim:

1. A process comprising:
    televising a sports game on network television through a major television network or a cable television broadcaster, said game being selected from the group consisting of baseball, basketball, football, hockey and soccer;
    wherein the sports game comprises a first team and a second team;
    wherein a portion of a first uniform which is worn by the first team is a different color than a portion of a second uniform which is worn by the second team;
    displaying written information on a television screen relating to the first team;
    displaying written information on the television screen relating to the second team;
    coloring a first object on the television screen the same color as the portion of the first uniform, the first object being selected from the group consisting of a background of the written information relating to the first team and the written information relating to the first team; and
    coloring a second object the same color as the portion of the second uniform, the second object being selected from a group consisting of a background of the written information relating to the second team and the written information relating to the second team.

2. The process of claim 1 wherein the portion of the first uniform is a jersey and the portion of the second uniform is a jersey.

3. The process of claim 1 wherein:
    the portion of the first uniform is a helmet and the portion of the second uniform is a helmet; and
    the game is selected from the group consisting of baseball, football, and hockey.

4. The process of claim 1 wherein:
    the portion of the first uniform is a jersey and the portion of the second uniform is a helmet; and
    the game is selected from the group consisting of baseball, football, and hockey.

5. The process of claim 1 wherein:
    the first object is the background of the written information relating to the first team; and
    the second object is the background of the written information relating to the second team.

6. The process of claim 1 wherein:
    the written information relating to the first team comprises the first team's name and the first team's score; and
    the written information relating to the second team comprises the second team's name and the second team's score.

7. The process of claim 1 wherein:
    the written information relating to the first team comprises team statistics; and
    the written information relating to the second team comprises team statistics.

8. The process of claim 1 wherein:
    the written information relating to the first team comprises individual player's statistics; and
    the written information relating to the second team comprises individual player's statistics.

9. A process comprising:
    a major television network or a cable television broadcaster displaying a scoreboard on a television screen of network television;
    displaying a sports game on the television screen, said sports game being selected from the group consisting of baseball, basketball, football, hockey and soccer, said sports game comprising two players each wearing a portion of a uniform;
    wherein the two portions of the uniforms are different colors; and
    providing background colors to the scoreboard corresponding to the colors of the two portions of the uniforms.

* * * * *